US008572673B2

(12) United States Patent
Duffy

(10) Patent No.: US 8,572,673 B2
(45) Date of Patent: Oct. 29, 2013

(54) DATA PROCESSING APPARATUS AND METHOD

(76) Inventor: Dominic Gavan Duffy, Cambridgeshire (GB)

( * ) Notice: Subject to any disclaimer, the term of this patent is extended or adjusted under 35 U.S.C. 154(b) by 956 days.

(21) Appl. No.: 11/629,158

(22) PCT Filed: Jun. 10, 2005

(86) PCT No.: PCT/GB2005/002296
§ 371 (c)(1),
(2), (4) Date: Nov. 27, 2007

(87) PCT Pub. No.: WO2005/121921
PCT Pub. Date: Dec. 22, 2005

(65) Prior Publication Data
US 2008/0216147 A1 Sep. 4, 2008

(30) Foreign Application Priority Data

Jun. 10, 2004 (GB) ................... 0413034.0

(51) Int. Cl.
*G06F 21/00* (2013.01)
(52) U.S. Cl.
USPC .............................................. 726/1
(58) Field of Classification Search
USPC ................................. 726/1, 2, 4, 21
See application file for complete search history.

(56) References Cited

U.S. PATENT DOCUMENTS

| 4,109,237 A | 8/1978 | Hill |
| 4,135,147 A | 1/1979 | Riganati et al. |
| 4,187,392 A | 2/1980 | Safford |
| 4,316,055 A | 2/1982 | Feistel |
| 4,641,349 A | 2/1987 | Flom et al. |
| 4,805,222 A | 2/1989 | Young et al. |
| 5,067,162 A | 11/1991 | Driscoll et al. |
| 5,291,560 A | 3/1994 | Daugman |

(Continued)

FOREIGN PATENT DOCUMENTS

| CN | 1281608 A | 1/2001 |
| DE | 4243908 A1 | 6/1994 |

(Continued)

OTHER PUBLICATIONS

Claus et al., "Biometric Hash Based on Statistical Features of Online Signatures", Pattern Recognition, 2002. Proceedings.16th International Conference on Publication Date:2002, vol. 1, pp. 123-126.

(Continued)

*Primary Examiner* — Brandon Hoffman
*Assistant Examiner* — Anthony Brown
(74) *Attorney, Agent, or Firm* — Smith Gambrell & Russell LLP

(57) ABSTRACT

There is a described a method of certifying compliance with a designated process defined by a plurality of rules which are specified in a public template, wherein at least one rule associated with a process includes a certification requirement which requires compliance with that rule to be certified by a rule certifying authority. A processing apparatus operating in a secure environment receives rule compliance data and checks the received rule compliance data to verify that any certification requirement has been satisfied. If the processing apparatus confirms that all the rules specified in the public template are satisfied, then the processing apparatus issues a process compliance certificate which is digitally signed by the process certifying authority.

21 Claims, 13 Drawing Sheets

(56) References Cited

U.S. PATENT DOCUMENTS

| | | | |
|---|---|---|---|
| 5,347,580 A | 9/1994 | Molva et al. | |
| 5,497,430 A | 3/1996 | Sadovnik et al. | |
| 5,541,994 A | 7/1996 | Tomko et al. | |
| 5,680,460 A | 10/1997 | Tomko et al. | |
| 5,680,470 A | 10/1997 | Moussa et al. | |
| 5,712,807 A | 1/1998 | Bangham | |
| 5,832,091 A | 11/1998 | Tomko et al. | |
| 5,933,516 A | 8/1999 | Tu et al. | |
| 5,991,408 A | 11/1999 | Pearson et al. | |
| 6,035,398 A | 3/2000 | Bjorn | |
| 6,038,315 A | 3/2000 | Strait et al. | |
| 6,067,369 A | 5/2000 | Kamei | |
| 6,078,667 A | 6/2000 | Johnson | |
| 6,098,330 A | 8/2000 | Schmitt et al. | |
| 6,154,285 A | 11/2000 | Teng et al. | |
| 6,170,073 B1 | 1/2001 | Jarvinen et al. | |
| 6,185,316 B1 | 2/2001 | Buffam | |
| 6,202,151 B1 | 3/2001 | Musgrave et al. | |
| 6,219,794 B1 | 4/2001 | Soutar et al. | |
| 6,330,674 B1 | 12/2001 | Angelo et al. | |
| 6,363,485 B1 | 3/2002 | Adams et al. | |
| 6,567,765 B1 | 5/2003 | Wu et al. | |
| 6,678,821 B1 | 1/2004 | Waugh et al. | |
| 6,687,375 B1 | 2/2004 | Matyas et al. | |
| 6,901,145 B1 | 5/2005 | Bohannon et al. | |
| 6,940,976 B1 | 9/2005 | Matyas et al. | |
| 6,957,337 B1 | 10/2005 | Chainer et al. | |
| 6,959,874 B2 | 11/2005 | Bardwell | |
| 6,968,459 B1 | 11/2005 | Morgan et al. | |
| 7,046,829 B2 | 5/2006 | Udupa et al. | |
| 7,146,422 B1* | 12/2006 | Marlatt et al. | 709/227 |
| 2,007,549 A1 | 4/2007 | Fujii et al. | |
| 7,274,804 B2 | 9/2007 | Hamid | |
| 7,526,653 B1 | 4/2009 | Vogel et al. | |
| 7,694,151 B1* | 4/2010 | Johnson et al. | 713/189 |
| 2001/0025342 A1 | 9/2001 | Uchida | |
| 2002/0002543 A1* | 1/2002 | Spooren et al. | 705/57 |
| 2002/0056040 A1 | 5/2002 | Simms | |
| 2002/0124176 A1 | 9/2002 | Epstein | |
| 2002/0174347 A1 | 11/2002 | Ting | |
| 2002/0199103 A1 | 12/2002 | Dube | |
| 2003/0007646 A1* | 1/2003 | Hurst et al. | 380/285 |
| 2003/0179909 A1 | 9/2003 | Wong et al. | |
| 2003/0204732 A1 | 10/2003 | Audebert et al. | |
| 2003/0217264 A1 | 11/2003 | Martin et al. | |
| 2004/0107367 A1 | 6/2004 | Kisters | |
| 2004/0111625 A1 | 6/2004 | Duffy et al. | |
| 2004/0128502 A1 | 7/2004 | Royer | |
| 2004/0218762 A1 | 11/2004 | Le Saint et al. | |
| 2004/0243356 A1 | 12/2004 | Duffy et al. | |
| 2005/0021954 A1 | 1/2005 | Kung | |
| 2005/0246763 A1 | 11/2005 | Corcoran et al. | |
| 2006/0075255 A1 | 4/2006 | Duffy et al. | |
| 2006/0083372 A1 | 4/2006 | Chang et al. | |
| 2006/0090114 A1 | 4/2006 | Duffy et al. | |
| 2006/0153369 A1 | 7/2006 | Beeson | |
| 2006/0198514 A1 | 9/2006 | Lyseggen et al. | |
| 2006/0227974 A1 | 10/2006 | Haraszti | |
| 2008/0216147 A1 | 9/2008 | Duffy | |

FOREIGN PATENT DOCUMENTS

| | | |
|---|---|---|
| DE | 19715644 A1 | 10/1998 |
| DE | 19936097 A1 | 2/2001 |
| EP | 0779595 A2 | 6/1997 |
| EP | 0786735 A2 | 7/1997 |
| JP | 4-55849 U | 5/1992 |
| JP | 9-147072 A | 6/1997 |
| JP | 9-161053 A | 6/1997 |
| JP | 11-73103 A | 3/1999 |
| WO | WO 98/48538 | 10/1998 |
| WO | WO 99/65175 | 12/1999 |
| WO | WO 00/14716 | 3/2000 |
| WO | WO 00/51280 | 8/2000 |
| WO | WO 00/65770 | 11/2000 |
| WO | WO 00/74301 A1 | 12/2000 |
| WO | WO 01/63385 A1 | 8/2001 |
| WO | WO 02/052480 A | 7/2002 |
| WO | WO 02/052480 A1 | 7/2002 |
| WO | WO 02/065693 A2 | 8/2002 |
| WO | WO 02/098053 A2 | 12/2002 |
| WO | WO 03/034655 A1 | 4/2003 |
| WO | WO 03/065169 A2 | 8/2003 |
| WO | WO 03/103216 A2 | 12/2003 |
| WO | WO 03/103217 A1 | 12/2003 |
| WO | WO 2004/006076 A2 | 1/2004 |
| WO | WO 2005/121921 A1 | 12/2005 |

OTHER PUBLICATIONS

Hao et al., "Combining Crypto with Biometrics Effectively", IEEE Transactions on Computers Sep. 2006, pp. 1081-1088, vol. 55, No. 9, IEEE Computer Society.

Uludag et al., "Biometric Cryptosystems: Issues and Challenges", Proceedings of the IEEE, Jun. 2004, vol. 92, No. 6. pp. 948-960.

Daugman, "How IRIS Recognition Works", pp. 1-10, University of Cambridge, The Computer Laboratory. Cambridge CB2 3QG, U.K., www.CL.Cam.ac.uldusers/jdg1000.

Monrose et al., "Cryptographic Key Generation From Voice", IEEE Symposium on Security and Privacy, 2001, pp. 202-213.

"Secure Execution Engine" White Paper, pp. 1-11, NCIPHER.

Riha et al. "Biometric Authentication Systems", FI MU Report Series, Nov. 2000, pp. 1-44, Faculty of Informatics Masaryk University.

Daugman, "High Confidence Visual Recognition of Persons by a Test of Statistical Independence", IEEE Transactions on Pattern Analysis and Machine Intelligence, vol. 15, No. 11, Nov. 1993, pp. 1148-1161.

Davida et al., "On the Relation of Error Correction and Cryptography to an Off Line Biometric Based Identification Scheme," Nov. 29, 1998, pp. 1-10.

Client Security in the Enterprise Network: Dell's Perspective, Dell Highlight, Feb. 2000, pp. 1-6.

Cavoukian et al., "Biometric Encryption: A Positive—Sum Technology that Achieves Strong Authentication", Security and Privacy, Mar. 2007, pp. 1-48, Information and Privacy Commissioner.

Clancy, Secure Smartcard—Based Fingerprint Authentication, WBMA'03, Nov. 8, 2003, pp. 45-52, Berkeley, California, USA.

Mark, The Development of Destination—Specific Biometric Authentication, pp. 77-80.

UMTS 33.22 V1.0.0, 3GPP Systems and Services TSG, Security WG, Feb. 2-4, 1999, pp. 1-18.

Daugman, "How IRIS Recongnition Works", IEEE Transactions on Circuits and Systems for Video Technology, vol. 14, No. 1, Jan. 2004, pp. 21-30, University of Cambridge, The Computer Laboratory, Cambridge CB2 3QG, U.K. www.CL.Cam.ac.uk/uscrs/idg1000.

"Secure Exution Engine" White Paper, pp. 1-11. NCIPHER Year of Publication: 2001.

Mark, The Development of Destination—Specific Biometric Authentication, pp. 77-80, Year of Publication: 2000.

David et al., "Smart Cards and Biometrics: Your Key to PKI", Mar. 1, 1999, http://www.linuxjournal.com/article/3013.

* cited by examiner

DATA PROCESSING APPARATUS AND METHOD

CROSS-REFERENCE TO RELATED APPLICATIONS

This application is a U.S. National Stage of International Patent Application No. PCT/GB2005/002296, filed Jun. 10, 2005, which claims priority of British Patent Application No. GB 0413034.0, filed Jun. 10, 2004. Both PCT/GB2005/002296 and GB 0413034.0 are incorporated herein by reference.

This invention relates to the certification by a processing apparatus that a defined procedure has been followed when performing a requested processing operation.

With the development of computer networks, it is now commonplace that a computer apparatus requests a remote computer apparatus to perform a processing operation. Often, the nature of the processing operation requires some form of data security operation be performed. For example, in some applications the authenticity of generated data requires verification. In other applications, access to confidential data needs to be controlled.

Various techniques are known in the art for confirming the authenticity of transmitted data. The main technique involves the issuance of a certificate in which a digital signature is appended onto a segment of data to allow confirmation that the data segment has not been tampered with and/or confirmation of the identity of the originator of the data segment. The conventional technique for generating a digital signature is to apply a one-way encryption algorithm, such as MD5 or SHA, to the data segment to be authenticated in order to generate a message digest, and then encrypting the message digest using a private key associated with the party authenticating the data, hereafter called the signatory authority or SA. The recipient of the data is then able to apply the same one-way encryption algorithm to the data segment and then compare the resultant message digest with the result of decrypting the digital signature with the public key associated with the SA. In this way, it is possible to verify that there has been no tampering with the data. In order to verify the identity of the SA, a public key certificate associating a public key with the SA is issued by a Certificate Authority (CA).

In practice, many signatory authorities delegate the power to authenticate data to delegated signatory authorities (DSAs). This involves the issuance of a certificate to the DSA which has been signed by the SA using the private key of the SA. However, certificates subsequently issued by a DSA are not themselves reviewed by the SA, but rather the SA has to trust the DSA.

Even in cases where the SA directly issues the certificate, it is normal that the SA only certifies that a predefined procedure has been followed rather than that the data in the certificate is correct. Typically, the SA relies on data provided by external sources that are not identified in the certificate.

A problem therefore arises that in many cases certificates are issued which rely upon trust of multiple parties without the certificates making clear in what respects the parties are trusted. In these circumstances, if there is any subversion of the signing procedure, then it can be very difficult to identify who was responsible for the subversion and accordingly who is liable for any damage caused by that subversion.

According to an aspect of the present invention, there is provided a method of certifying compliance with a designated process defined by a plurality of rules which are specified in a public template, wherein at least one rule associated with a process includes a certification requirement which requires compliance with that rule to be certified by a rule certifying authority. A processing apparatus operating in a secure environment receives rule compliance data and checks the received rule compliance data to verify that any certification requirement has been satisfied. If the processing apparatus confirms that all the rules specified in the public template are satisfied, then the processing apparatus issues a process compliance certificate which is digitally signed by the process certifying authority.

In this way, the processing apparatus confirms that the rules set out in the public template have been complied with. This involves confirming that other parties have certified that various rules defined in the public template have been complied with. Preferably, an audit trail is included in the process compliance certificate identifying who has certified compliance with any rules whose compliance needs certification.

By decoupling the template from the processing apparatus, the security of operation of the processing apparatus can be improved. In a preferred embodiment, the processing apparatus includes a hardware security model (HSM) which enables secure storage of cryptographic keys and the like.

According to another aspect of the invention, there is provided a data processing apparatus comprising a secure data store and a processor operable to carry out a processing operation using data stored in the secure data store. A controller prevents any processing using data stored in the secure data store unless a plurality of rules specified in a public template are complied with, wherein for at least one of the rules compliance requires certification by a certifying authority.

In an embodiment, the secure data store stores a cryptographic key and the processing operation comprises encrypting data using the cryptographic key. In another embodiment, the secure data store stores confidential information and the processing operation comprises accessing the confidential information.

Various embodiments of the invention will now be described with reference to the attached figures in which:

FIG. 1 schematically shows data flows associated with the issuance of a driving permit by a secure processing apparatus;

FIRST EMBODIMENT

In the first embodiment, a secure processing apparatus 1 is able to perform various different processing operations resulting in the outputting of certified data. In this embodiment, the security of the processing apparatus 1 is provided by physically restricting access to the processing apparatus 1. In particular, the processing apparatus is located in a room to which only authorised personnel are granted access.

Figure 1:
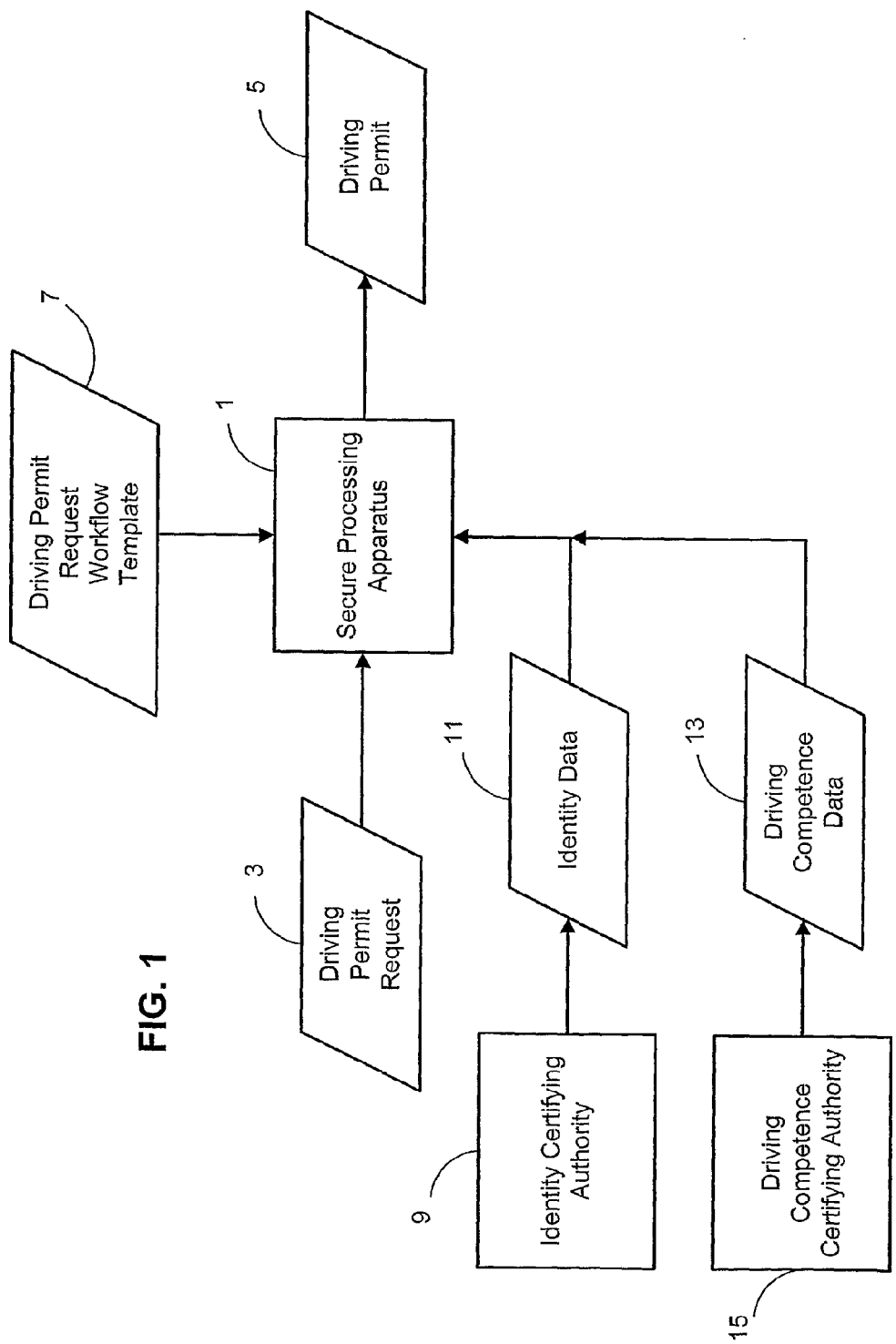

As an example of one of the processing operations performed by the secure processing apparatus 1, FIG. 1 schematically shows the data flows into and out of the secure processing apparatus 1 during the processing of a request 3 for a driving permit by the secure processing apparatus 1. In accordance with the invention, the conditions under which the secure processing apparatus 1 will issue the driving permit 5 are defined in a driving permit request workflow template 7. In this embodiment, the driving permit request workflow template is retrieved by the secure processing apparatus 1 from a public store (not shown).

In this embodiment, the driving permit 5 is generated by adding a digital signature generated using a private key drivingCertificate_signKey which was itself generated using the RSA algorithm and is unique to this processing operation. The driving permit request workflow template 7 specifies two requirements which need to be satisfied before a driving permit 5 is issued, namely:

(1) The identity of the applicant must be verified.
(2) The driving ability of the applicant must be verified.

For each of these requirements, the driving permit request workflow template 7 also specifies rules concerning how the requirements may be met.

With regard to the identity check, the driving permit request workflow template 7 specifies that the received identity data must be verified by an authorised identity certifying authority 9. In this embodiment, an authorised identity certifying authority is identified by the condition "identityRegistrar=true" in an X.509V3 extension to the public key certificate of the identity certifying authority.

With regard to the driving ability check, the driving permit workflow template 7 specifies that either possession by the applicant of a previous valid US driving permit must be verified by an authorised party or the passing of a driving test must be verified by an authorised party. Authority to verify that the applicant has a previous valid US driving permit is identified by the condition "licenseRegistrar=true" in an X.509V3 extension to the public key certificate of the certifying authority, while authority to verify that the applicant has passed a driving test is indicated by the condition "drivingAssesor=true" in an X.509V3 extension to the public key certificate of the certifying authority.

In this embodiment, the driving permit workflow template 7 is written using Prolog-type script. In particular, the form of the driving permit workflow template 7 is as follows:

```
Resource    drivingCertificate_signKey   rsa   unique
Data        DrivingRequest
Result      drivingCertificate
secureOperation:
            generateSignature(DrivingRequest) using
            drivingCertificate_signKey
            provided
            drivingAuthorisationComplete.
drivingAuthorisationComplete:=
            identityCheckValid,
            drivingCapabilityAssessed.
drivingCapabilityAssessed:=
            validUSLicensePresented;
            specialTestPassed.
identityCheckValid:=
            identityRegistrar=true.
Valid USLicensePresented:=
            licenseRegistrar=true.
specialTestPassed:=
            drivingAssessor=true.
```

In the data flow sequence shown in FIG. 1, after receiving the driving permit request 3 and retrieving the driving permit request workflow template 7, the secure processing apparatus 1 receives identity data 11 from an identity certifying authority 9 and driving competence data 13 from a driving competence certifying authority 15. After checking that the identity certifying authority 9 is authorised to verify the identity of the applicant and that the driving competence certifying authority 15 is authorised to verify the driving ability of the applicant, the secure processing apparatus 1 issues the driving permit 5.

Figure 2:
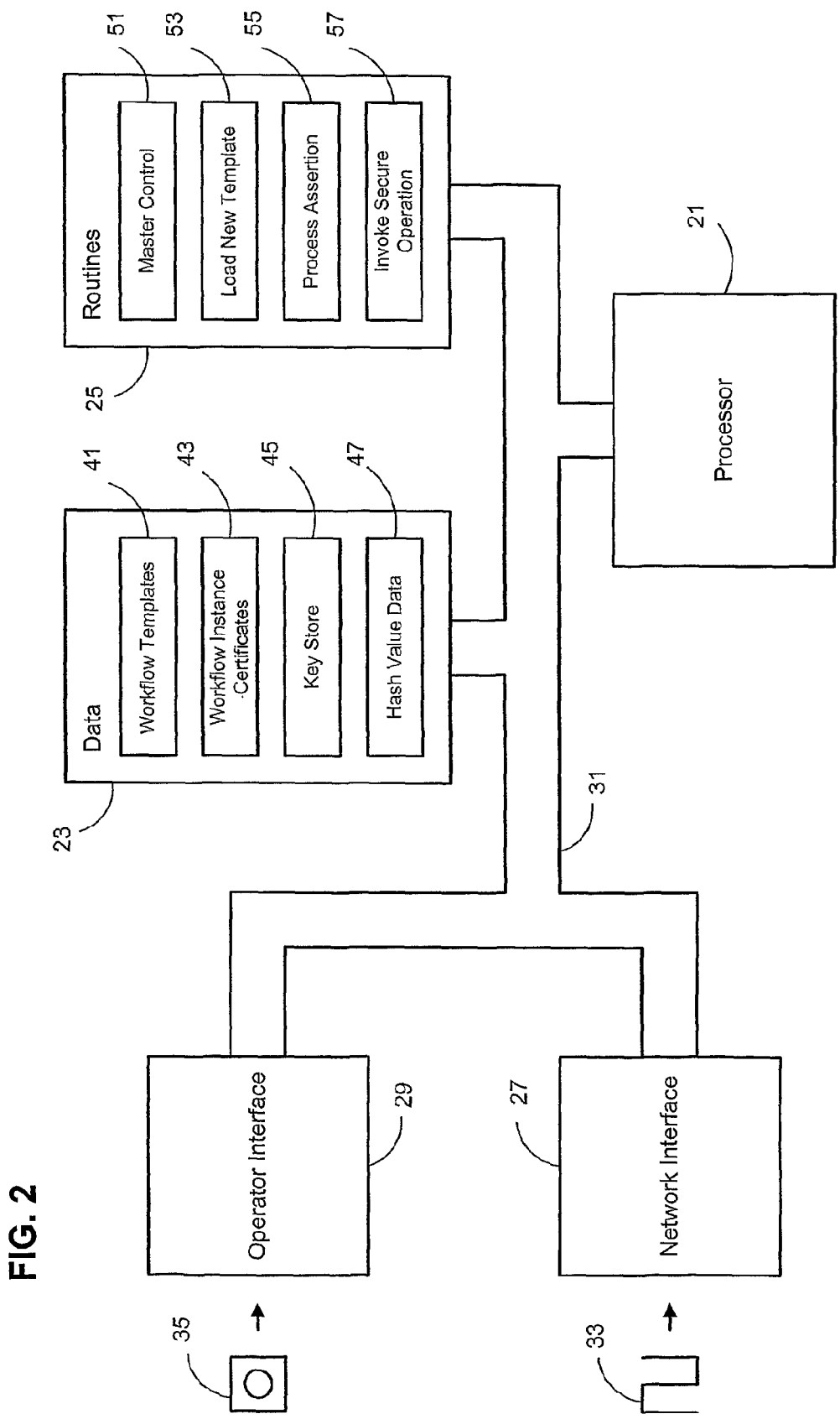
FIG. 2 is a block diagram schematically showing the main components of the secure processing apparatus illustrated in FIG. 1.

The main components of the secure processing apparatus will now be described with reference to FIG. 1. In this embodiment the secure processing apparatus 1 is a conventional computer having novel software and data structures stored therein for implementing the invention. As shown in FIG. 2, the secure processing apparatus 1 includes a conventional central processing unit (CPU) 21 which carries out processing operations, a memory region 23 storing data, a memory region 25 storing software routines, working memory (not shown), a conventional network interface 27 and a conventional operator interface 29 interconnected by a bus system 31. The data memory region 23 and the routines memory region 25 are memory regions on a hard disk memory.

The network interface 27 allows data to be input into and output from the secure processing apparatus 1 in the form of a signal 33. In this embodiment, the operator interface 29 includes a CD-ROM reader/writer (not shown) via which data stored on a CD-ROM 35 can be input into the secure processing apparatus 1 or data can be output by writing onto a CD-ROM.

As shown in FIG. 2, the data memory 23 stores workflow templates 41 for various different processing operations (including the driver permit issuing operation discussed with reference to FIG. 1). The data memory 23 also stores workflow instance certificates 43, with each workflow instance certificate logging actions relating to an instance of a respective workflow template. In this embodiment, a cryptographic key is associated with each of the workflow templates 41. These cryptographic keys are stored in a key store 45. Finally, the data memory 23 stores hash value data 47 for the workflow templates 41 and the key store 45 as an extra level of security against tampering.

The routines memory 25 stores a Master_Control routine 51 which controls the overall operation of the secure processing apparatus 1 by monitoring for interrupts indicating that a processing operation is required, and then initiating the processing operation. In particular: in response to receipt of a signal 33 requesting registration of a new workflow template, the Master_Control routine 51 initiates a Load_New_Template routine 53; in response to receipt of an assertion the Master_Control routine 51 initiates a Process_Assertion routine 55; and in response to receipt of a request to execute the secure operation associated with a workflow template, the Master_Control routine 51 initiates a Invoke_Secure_Operation routine 57.

The Load_New_Template routine 53, the Process_Assertion routine 55, and the Invoke_Secure_Operation routine 57 will now be described in detail.

The Load_New_Template Routine

Figure 3:
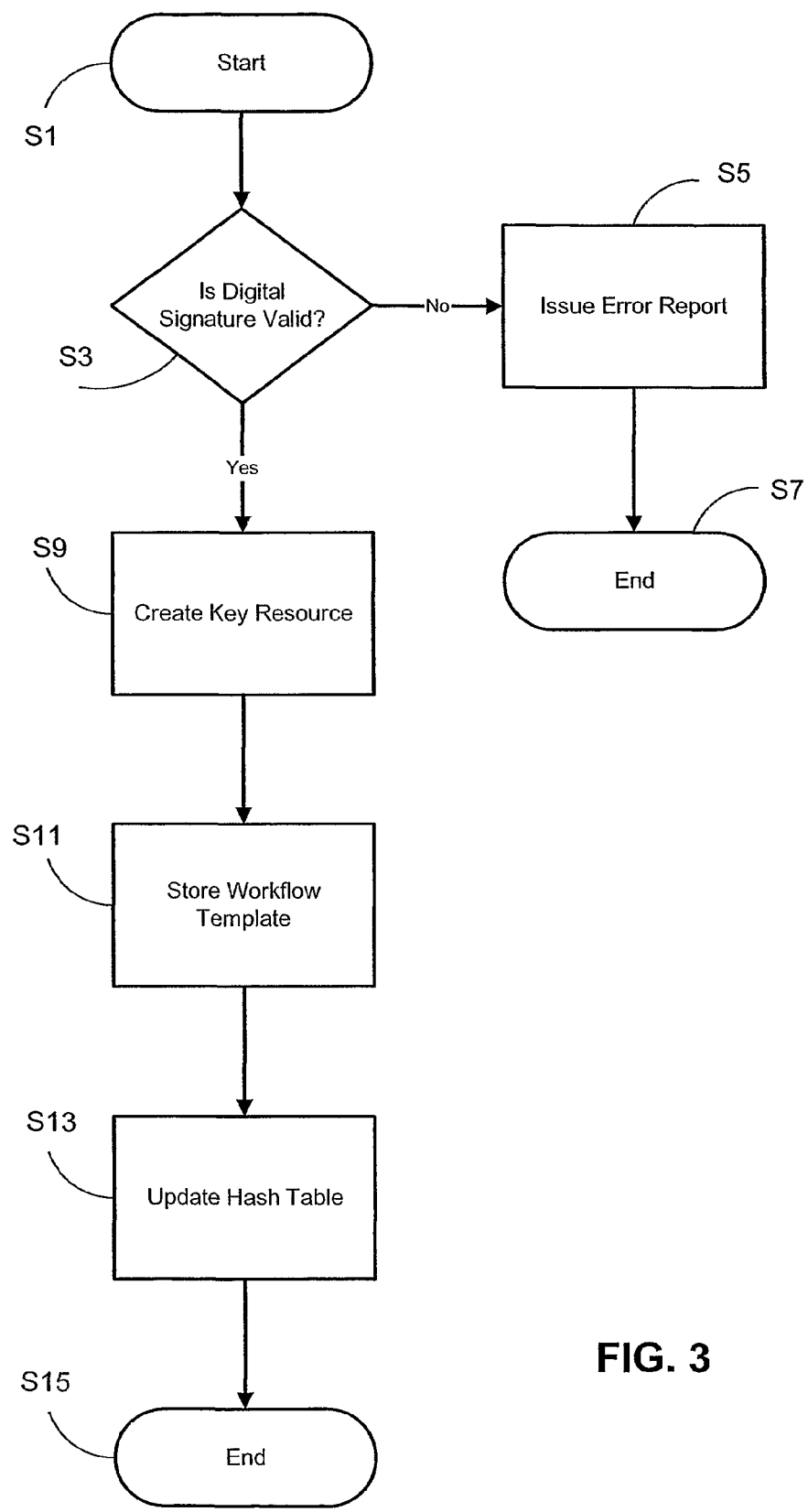
FIG. 3 is a flow chart schematically showing operations performed by a Load_New_Template sub-routine executed by the secure processing apparatus illustrated in FIG. 2.

The Load_New_Template routine will be described with reference to FIG. 3. The registration of a new workflow template is initiated by receipt of the new workflow template by the secure processing apparatus 1 together with an associated digital signature. After initiation, at S1, of the Load_New_Template routine 53, the secure processing apparatus 1 checks, at S3, that the digital signature is valid. In particular, the secure processing apparatus 1 uses the digital signature in a conventional manner to check the identity of the originator of the new workflow template and that the new workflow template was free from tampering. If the digital signature is not valid, the secure processing apparatus issues, at S5, an error report indicating that the digital signature is invalid, and the routine ends at S7.

Following successful validation of the digital signature, the secure processing apparatus creates, at S9, the key resources to be associated with the new workflow template. In this embodiment, the secure processing apparatus generates a public key and private key pair using the RSA algorithm, and then generates and issues a public key certificate for the public key. The generated private key is stored in the key store together with an identifier for associating the generated private key with the new workflow template.

The secure processing apparatus 1 then stores, at S11, the new workflow template in the workflow templates 41 part of the data memory 23. The secure processing apparatus then updates, at S13, the hash value data 47 stored in the data memory 23 to take account of the new workflow template and associated key resource, and the routine ends at S15.

The Process_Assertion Routine

The Process_Assertion routine 55 will be described with reference to FIG. 4. As shown, following initiation, at S21, of the Process_Assertion routine 55, the secure processing apparatus 1 determines, at S23, whether the received assertion is a request for establishing a new workflow instance (e.g. a request to start processing an application for a driving permit) or an assertion that a rule associated with an existing workflow instance has been complied with (such an assertion is sometimes called a predicate).

If the received assertion is determined to be a request for establishing a new workflow instance, the secure processing apparatus 1 initialises, at S25, a new workflow instance certificate which has an associated workflow instance certificate identifier. The secure processing apparatus 1 then outputs the workflow instance certificate identifier to the originator of the request so that the identifier may be attached to predicate assertions subsequently sent to comply with the requirements set out in the associated workflow template. The routine then ends at S29.

If it is determined that the received assertion is a predicate assertion, then the secure processing apparatus 1 checks, at S31, that the digital signature accompanying the predicate assertion is valid. If the digital signature is not valid, then the secure processing apparatus issues, at S33, an error report and the routine ends at S35.

If the digital signature is valid, then the secure processing apparatus 1 checks, at S37, the credentials of the signatory authority for the predicate assertion. In particular, the secure processing apparatus 1 checks that the signatory authority satisfies any requirement for a certifying authority set out in the workflow template for that predicate assertion. If the credentials are not valid, the secure processing apparatus 1 issues, at S39, an error report and the routine ends at S41. If the credentials of the signatory authority are valid, then the secure processing apparatus 1 appends, at S43, the predicate assertion and the associated digital signature to the workflow instance certificate and the routine ends at S45.

The Invoke_Secure_Operation Routine

Figure 5:
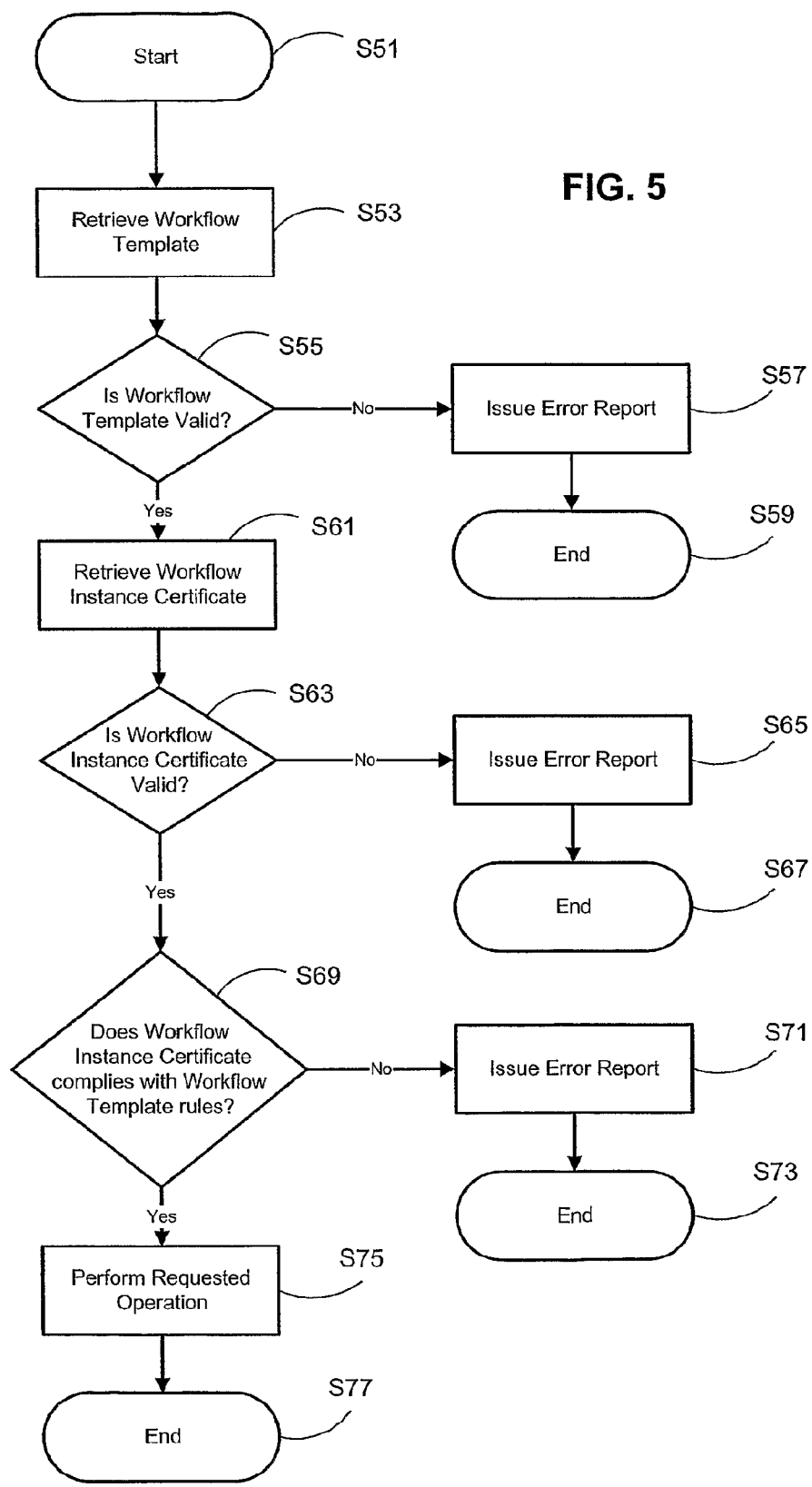
FIG. 5 is a flow chart schematically showing operations performed by a Invoke_Secure_Operation sub-routine execute by the secure processing apparatus illustrated in FIG. 2.

The Invoke_Secure_Operation routine 57 will be described with reference to FIG. 5. After initiation, at S51, of the Invoke_Secure_Operation routine 57 in response to receipt of a request to check compliance of a workflow instance certificate (identified by the corresponding workflow instance certificate identifier) with the requirements set out in a corresponding workflow template, the secure processing apparatus retrieves, at S51, the appropriate workflow template from the data memory 23 and checks, at S55, if the workflow template is valid by checking the digital signature associated with the workflow template.

If it is determined that the workflow template is not valid, then the secure processing apparatus issues, at S57, an error report and the routine ends at S59. If the workflow template is valid, then the secure processing apparatus 1 retrieves, at S61, the workflow instance certificate corresponding to the workflow instance identifier and checks, at S61 that the information within the workflow instance certificate is valid. If it is determined that the information within the workflow instance certificate is not valid, then the secure processing apparatus 1 issues, at S65, an error report and the routine ends at S67.

If it is determined that the information in the workflow instance certificate is valid, then the secure processing apparatus 1 checks, at S69, that the requirements set out in the workflow template are satisfied by the predicate assertions recorded in the workflow instance certificate. If it is determined that the requirements of the workflow template are not satisfied, then the secure processing apparatus 1 issues, at S71, an error report and the routine ends at S73.

If it is determined that the requirements of the workflow template are satisfied, then the secure processing apparatus 1 performs, at S75, the requested operation and the routine ends at S77.

In this embodiment, for all workflow templates the performance of the requested operation involves the outputting of requested data. When outputting the requested data, the secure processing apparatus 1 signs the requested data by generating a digital signature using the private key associated with the appropriate workflow template. This digital signature may be used to confirm the veracity of the requested data. Further, the digital signature certifies compliance with the requirements set out in the workflow template.

In this embodiment, in addition to appending the digital signature to the workflow certificate, the secure processing apparatus 1 also appends the corresponding workflow instance certificate. In this way, the workflow instance certificate can readily be used as an audit trail to identify who has certified compliance with individual requirements set out in the workflow template. Accordingly, if subversion of the process is later identified then the investigation into the cause of the subversion is facilitated, and any blame or liability can be allocated.

It will be appreciated that the routines stored by the secure processing apparatus are independent of the details of the workflow templates. This is advantageous because no access to the routines stored in the secure processing apparatus is required when adding a new workflow template.

SECOND EMBODIMENT

In the first embodiment, the security of the secure processing apparatus 1 is assured by locating the secure processing apparatus 1 in a room with restricted access. A second embodiment will now be described with reference to FIGS. 6 to 15 in which a secure processing apparatus is used having a hardware security module (HSM) which allows secure storage of data and is able to execute trusted code. A hardware security module provides tamper-proof physical protection and secure data storage. In this way, the need for restricting physical access to the secure process apparatus is removed for all but the most security-sensitive applications because the hardware security module provides an alternative secure environment.

Figure 6:
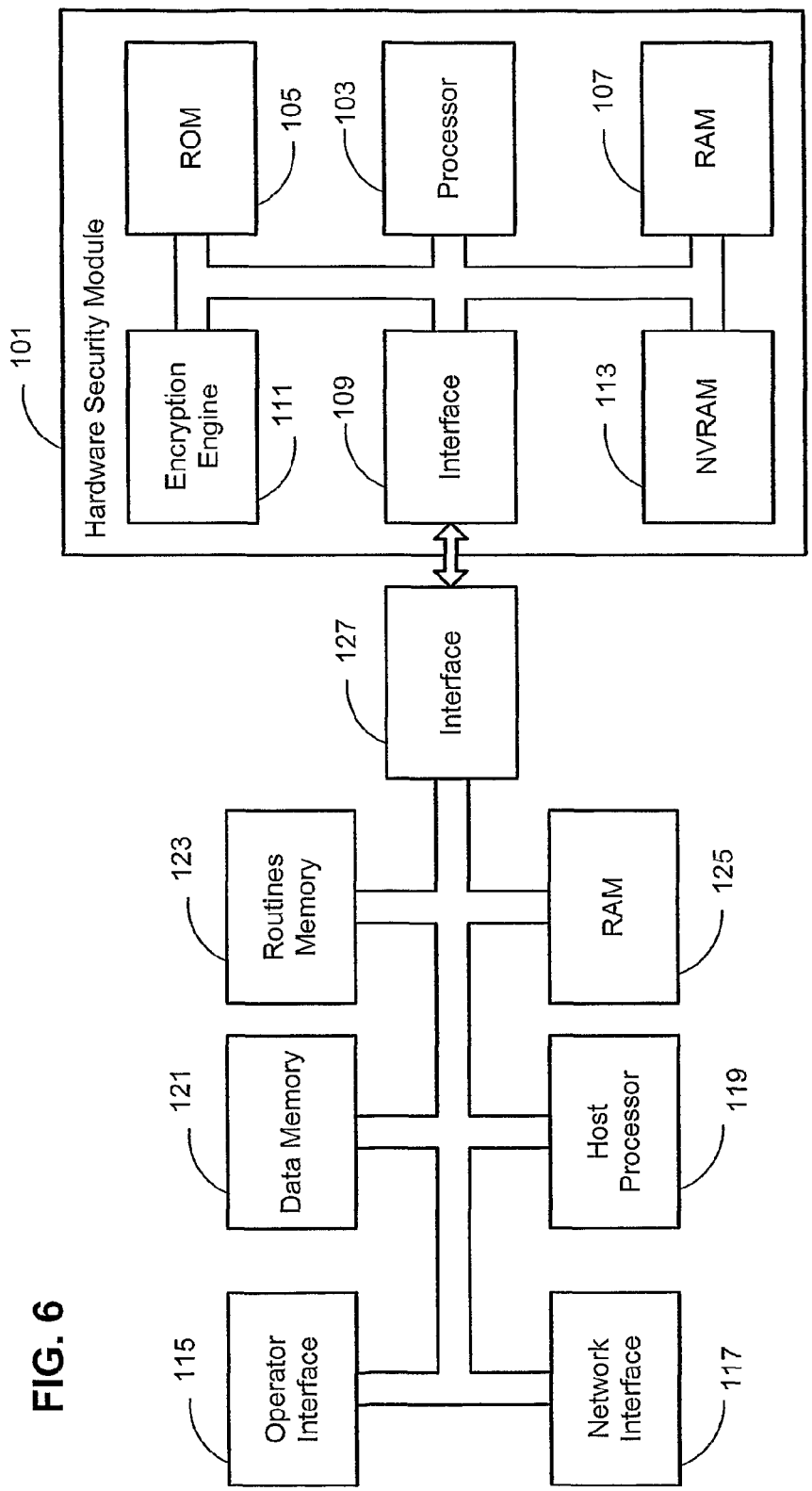
FIG. 6 is a block diagram schematically showing the main components of an alternative secure processing apparatus to the secure processing apparatus illustrated in FIG. 1.

As shown in FIG. 6, the secure processing apparatus includes a hardware security module 101, which in this embodiment is an nshield 800 PCI available from the ncipher Corporation Ltd. The hardware security module 101 includes a processor 103, read only memory (ROM) 105 which stores operating software for the hardware security module 101, a random access memory 107 which provides working memory (in this embodiment 128 MB) for when the hardware security module 101 is in use, and an interface 109 for receiving data from and sending data to the remainder of the secure processing apparatus. The hardware security module 101 also includes an encryption engine 111 which is provided with the nshield 800 PCI and is designed to be particularly suitable for standard encryption processes, and a small amount of non-volatile random access memory (NVRAM) 113 (in this embodiment 32 KB) for non-volatile storage of data.

The remainder of the secure processing apparatus includes: an operator interface 115, a network interface 117 and a host processor 119 which in this embodiment are identical with the corresponding components of the first embodiment; a data memory region 121, a routines memory region 123 and a random access memory (RAM) 125; and an interface 127 for communicating with the hardware security module 101.

In this embodiment, the data memory 121 and the routines memory 123 form part of a hard disk (not shown) which enables non-volatile storage. In this embodiment, data is transferred between the interface 127 and the interface 109 of the hardware security module 101 using command buffers.

The hardware security module 101 of the present embodiment does not include a hard disk, and the memory capacity of the NVRAM 113 is insufficient to store all the data and routines required to perform the secure processing functions. Accordingly, as will be discussed below, various techniques are employed to allow the required data and routines to be stored predominantly outside of the hardware security module 1 while maintaining a desired level of security.

Figure 7:
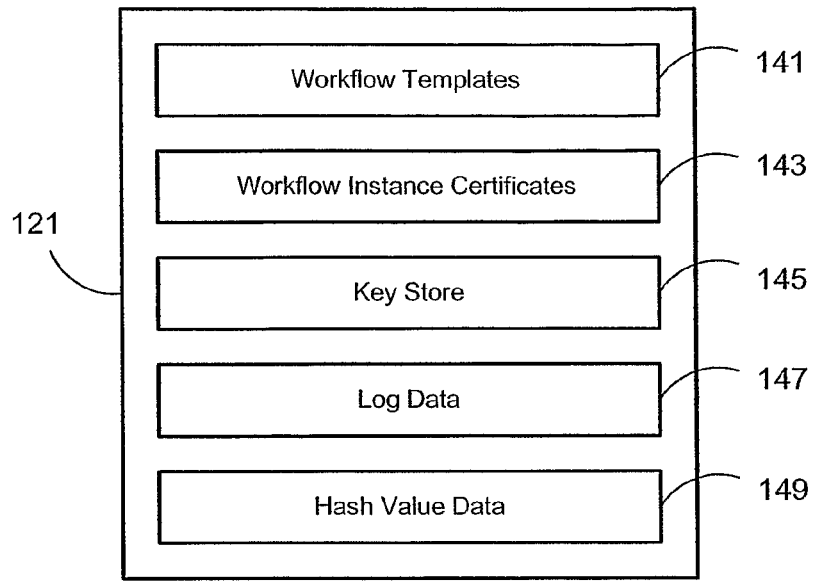
FIG. 7 is a block diagram schematically showing data stored in a data memory region of the secure processing apparatus illustrated in FIG. 6.

As shown in FIG. 7, the data memory region 121 stores workflow templates 141, workflow instance certificates 143 and a key store 145. In this embodiment, the data memory region 121 also stores log data 147 logging all processing operations performed by the hardware security module 101. In addition, the data memory region 121 stores hash value data 149 storing hash values generated by applying the SHA-1 one-way encryption algorithm to the data stored in the workflow templates region 141 to generate a workflow template hash value, to the key data stored in the key store region 145 to generate a key store hash value, and to the log data stored in the log data region 149 to generate a log data hash value.

In this embodiment, as will be apparent hereafter a secure copy of the hash value data is stored in the NVRAM 113.

Figure 8:
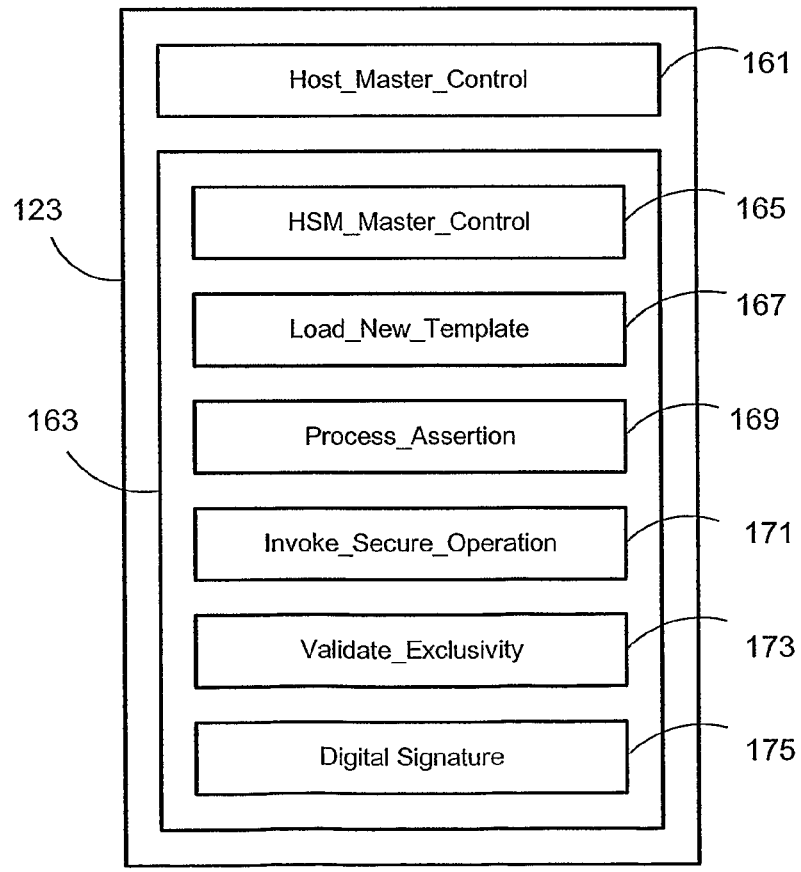
FIG. 8 is a block diagram schematically showing routines stored in a routine memory region of the secure processing apparatus illustrated in FIG. 6.

As shown in FIG. 8, the routines memory region 123 stores a Host_Master_Control routine 165 for controlling the operation of the host processor 119, and routine data 163 for the hardware security module 101. The routine data 163 includes:
 a HSM_Master_Control routine 165;
 a Load_New_Template routine 167;
 a Process_Assertion routine 169;
 an Invoke_Secure_Operation routine 171; and
 a Validate_Exclusivity routine 173.

A feature of the nShield hardware security module 101 used in this embodiment is compatibility with the Secure Execution Engine (SEE) technology developed by nCipher. The SEE technology enables the hardware security module 101 to execute code received externally provided that the received code is signed by an authorised party. Therefore, in this embodiment the routines data 163 for transmission to the hardware security module includes a digital signature 175 generated by applying a one-way encryption algorithm to the code transmitted to the hardware security module (i.e. the HSM_Master_Control routine 165, the Load_New_Template routine 167, the Process_Assertion routine 169, the Invoke_Secure_Operation routine 171 and the Validate_Exclusivity routine 173), and then encrypting the resulting code digest using the private key of an authorised party.

In this embodiment, when the secure processing apparatus is powered up the Host_Master_Control routine 161 transmits the routines data 163, via interface 127, to the hardware security module 101. The operating software of the hardware security module 101, on receiving the routines data 163, verifies the digital signature in order to check that the routines data 163 has not been tampered with and that the routines data 163 originated from an authorised party. If the digital signature is valid, then the routines data is stored in the RAM 107 and the HSM_Master_Control routine is executed by the hardware security module 101.

In addition to loading the routines data 163 onto the hardware security module 101, the Host_Master_Control routine 161 supports the operation of the hardware security module 101. On receipt, via the operator interface 115 or the network interface 117, of a request for a processing operation by the hardware security module 161, the Host_Master_Control routine 161 converts the request into a format for transmission to the hardware security module 101 and then transmits the formatted request to the hardware security module 101. Further, the Host_Master_Control routine handles requests from the hardware security module 101 for data from the data memory 121 by supplying the requested data to the hardware security module 101.

The routines executed by the hardware security module will now be discussed in more detail.

The HSM_Master_Control Routine

The HSM_Master_Control routine 165 monitors for signals received by the interface 109 indicating that a processing operation by the hardware security module is required, and then initiates the processing operation. In particular: in response to receipt of a signal requesting registration of a new workflow template, the HSM_Master_Control routine 165 initiates the Load_New_Template routine 167; in response to receipt of an assertion the HSM_Master_Control routine 165 initiates the Process_Assertion routine 169; in response to receipt of a request to execute the secure operation associated with a workflow template, the HSM_Master_Control routine 165 initiates the Invoke_Secure_Operation routine 171; and in response to receipt of a request for a validation of exclusivity, the HSM_Master_Control_Routine 165 initiates the Validate_Exclusivity routine 173.

The Load_New_Template Routine

The Load_New_Template routine 167 will be described with reference to FIGS. 9 to 12. The registration of a new workflow template is initiated by receipt of the new workflow template by the hardware security module 101 together with an associated digital signature.

Figure 9:
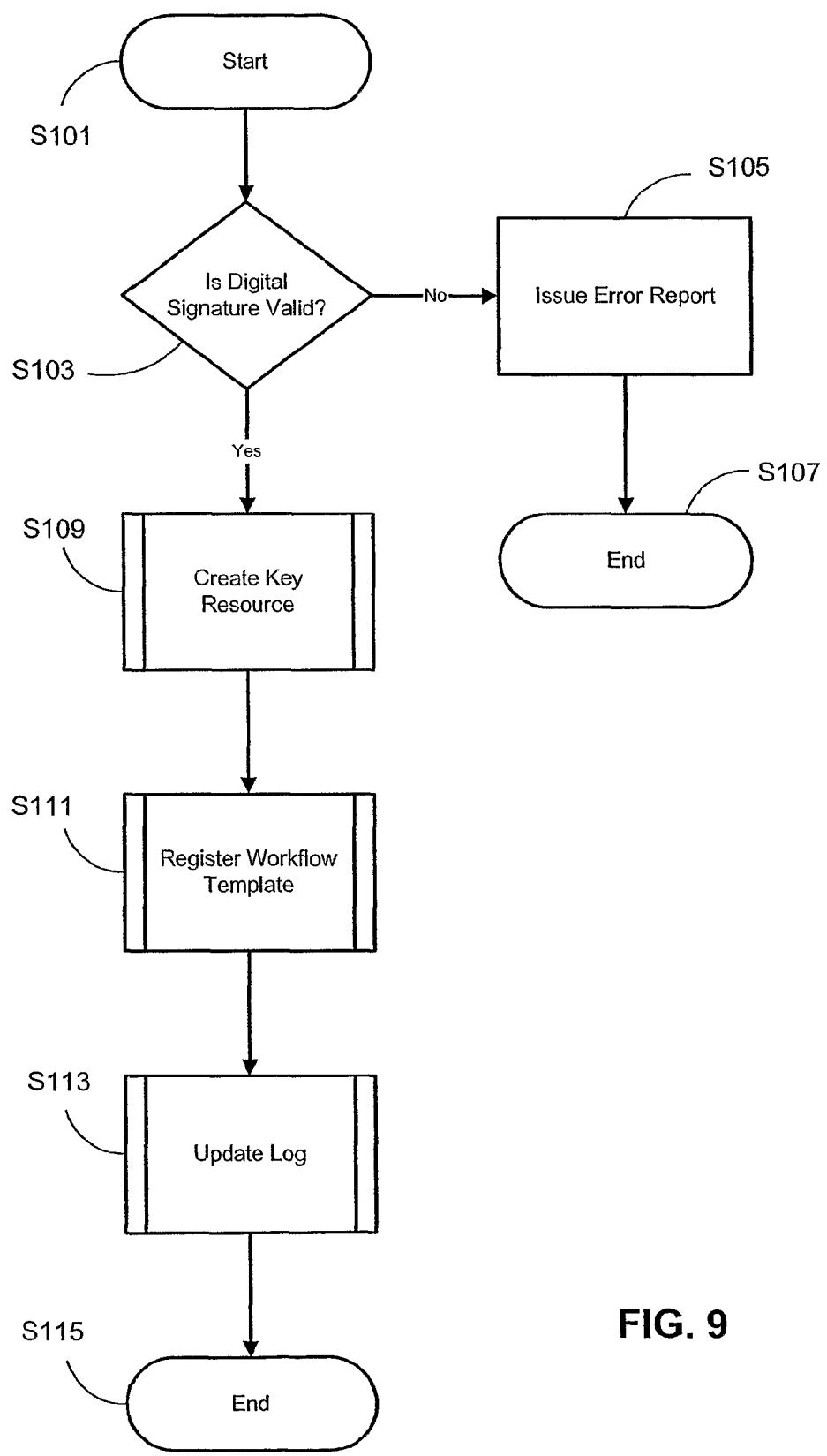
FIG. 9 is a flow chart schematically showing operations performed by a Load_New_Template sub-routine executed by the secure processing apparatus illustrated in FIG. 6.

As shown in FIG. 9, after initiation, at S101, of the Load_New_Template routine 167, the hardware security module 101 checks, at S103, that the digital signature received with the new workflow template is valid. In particular, the hardware security module 101 processes, using the encryption engine 111, the digital signature in a conventional manner to check the identity of the originator of the new workflow template and the integrity of the new workflow template (i.e. that it is free from tampering or data corruption). If the digital signature is not valid, the hardware security module 101 issues, at S105, an error report indicating that the digital signature is invalid, and the routine ends at S107.

Figure 10:
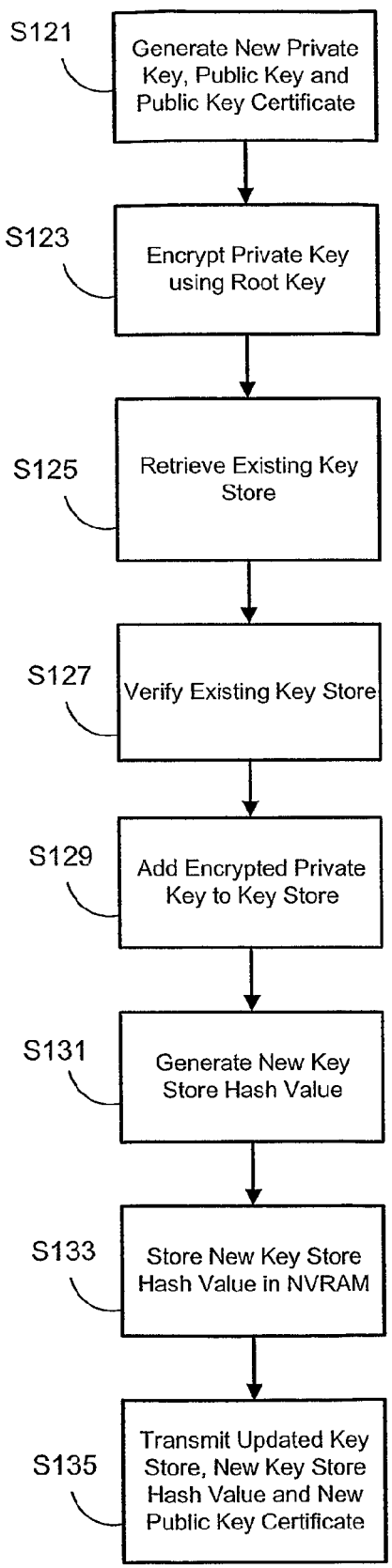
FIG. 10 is a flow chart schematically showing operations performed during execution of the Load_New_Template sub-routine to create a key resource.

Following successful validation of the digital signature, the secure processing apparatus creates, at S109, the key resources to be associated with the new workflow template using the encryption engine 111. The key resource creation will be described with reference to FIG. 10. As shown in FIG. 10, the hardware security module 101 generates, at S121, a public key and private key pair using the RSA algorithm, and then generates a public key certificate for the public key. The hardware security module 101 then applies, at S125, a symmetric encryption algorithm to the generated private key using a root cryptographic key stored in the ROM 105. In this way, the encrypted private key may be stored externally of the hardware security module 101 while maintaining the security of the private key itself. Accordingly, the hardware security module 101 allows secure storage of the private key.

After encrypting the private key, the hardware security module 101 retrieves, at S125, the existing key data stored in the key store 145, and then verifies, at S127, the integrity of the retrieved key data by applying the SHA-1 algorithm to the retrieved key store data and checking that the generated hash value matches the key store hash value stored in the NVRAM 113. The hardware security module 101 then updates, at S129, the key store data by adding the encrypted private key, and then generates, at S131, a new key store hash value by applying the SHA-1 algorithm to the updated key store data. After storing, at S133, the new key store hash value in the NVRAM 113 in place of the old key store hash value, the hardware security module transmits, at S135, the updated key store data, the new key store hash value and the public key certificate to the remainder of the secure processing apparatus.

When the updated key store data, the new key store hash value and the public key certificate are received by the remainder of the secure processing apparatus, the Host_Master_Control routine replaces the existing key store data in the key store region 145 by the updated key store data, replaces the existing key store hash value stored in the hash value data region 149 by the new key store hash value data, and broadcasts the public key certificate to a number of public key certificate repositories.

Returning to FIG. 9, the Load_New_Template routine then registers, at S111, the new workflow template. This registration will be described in more detail with reference to FIG. 11.

Figure 11:
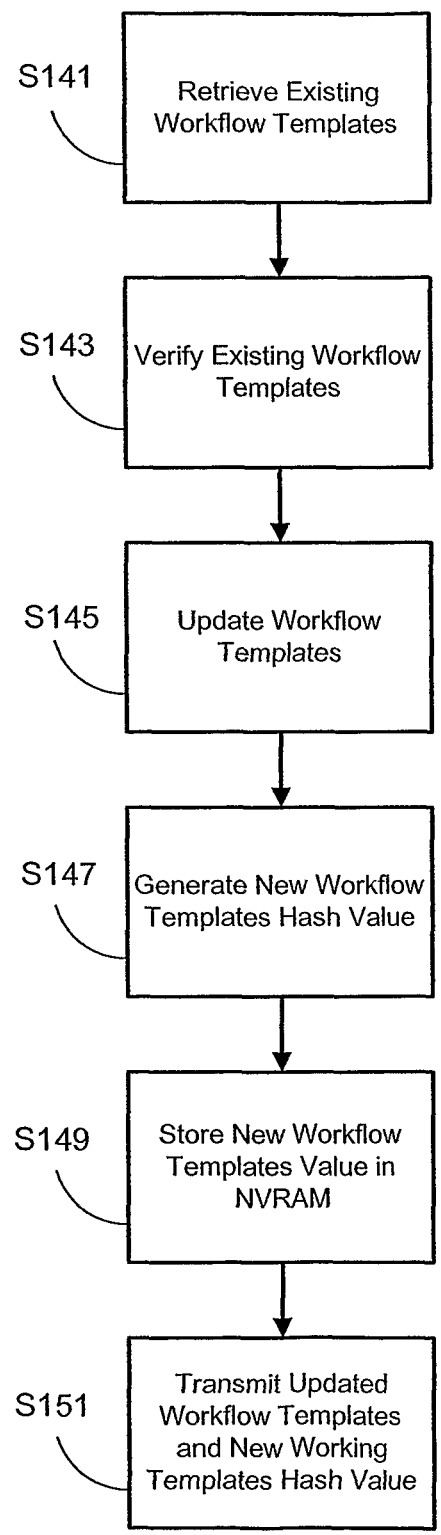
FIG. 11 is a flow chart schematically showing operations performed during execution of the Load_New_Template sub-routine to register a workflow template.

As shown in FIG. 11, the hardware security module 101 retrieves, at S141, the existing workflow template data stored in the workflow template data region 141, and then verifies, at S143, the existing workflow template data by applying the SHA-1 algorithm to the retrieved workflow template data and checking that the generated hash value matches the workflow templates hash value stored in the NVRAM 113. The hardware security module 101 then updates, at S145, the workflow templates data by adding the new workflow template data and generates, at S147, a new workflow templates hash value by applying the SHA-1 algorithm to the updated workflow templates data. After storing, at S149, the new workflow templates hash value in the NVRAM 113 in place of the old workflow templates hash value, the hardware security module transmits, at S151, the updated workflow templates data and the new workflow templates hash value to the remainder of the secure processing apparatus.

When the updated workflow templates data and the new workflow templates hash value are received by the remainder of the secure processing apparatus, the Host_Master_Control routine replaces the existing workflow templates data in the workflow templates region 141 by the updated workflow templates data and replaces the existing workflow templates hash value stored in the hash value data region 149 by the new workflow templates hash value data.

Returning to FIG. 9, the hardware security module then updates, at S113, the log data. This updating operation will be described with reference to FIG. 12.

Figure 12:
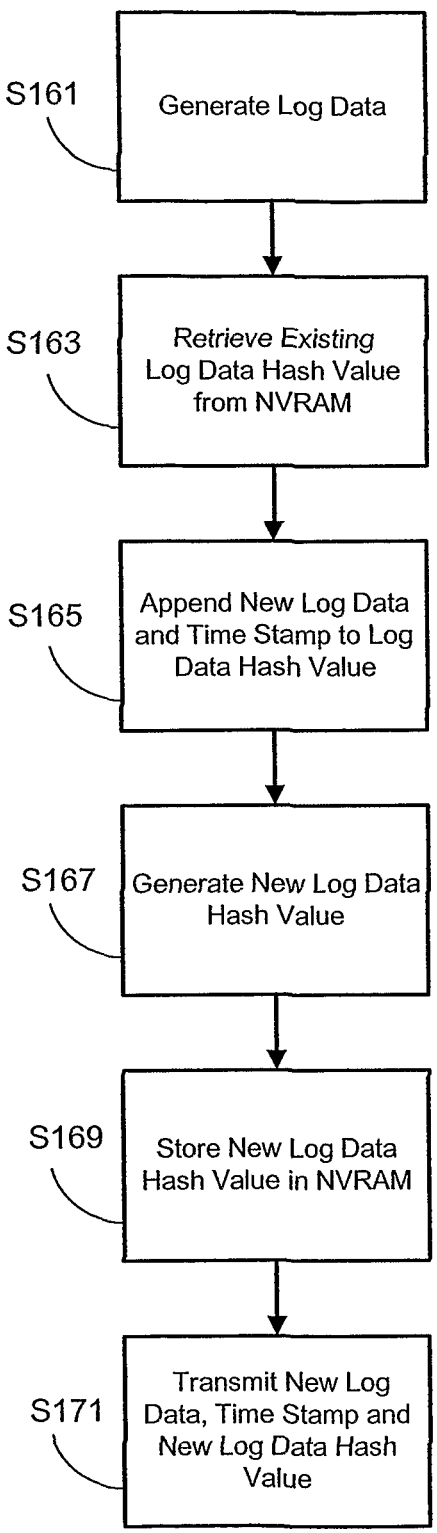
FIG. 12 is a flow chart schematically showing operations performed during execution of the Load_New_Template sub-routine to update log data.

As shown in FIG. 12, the hardware security module 101 generates, at S161, log data for the operation performed. The hardware security module 101 then retrieves, at S163, the existing log data hash value stored in the NVRAM 113. The hardware security module 101 then appends, at S165, the new log data and a time stamp to the log data hash value and generates, at S167, a new log data hash value by applying the SHA-1 algorithm to the combination of the new log data, the timestamp and the existing log data hash value. After storing, at S169, the new log data hash value in the NVRAM 113 in place of the old log data hash value, the hardware security module 101 transmits, at S171, the new log data and the new log data hash value to the remainder of the secure processing apparatus.

When the new log data and the new log data hash value are received by the remainder of the secure processing apparatus, the Host_Master_Control routine stores the new log data together with the existing log data in the log data region 147 and replaces the existing log data hash value stored in the hash value data region 149 by the new log data hash value.

The Process Assertion Routine

Figure 13:
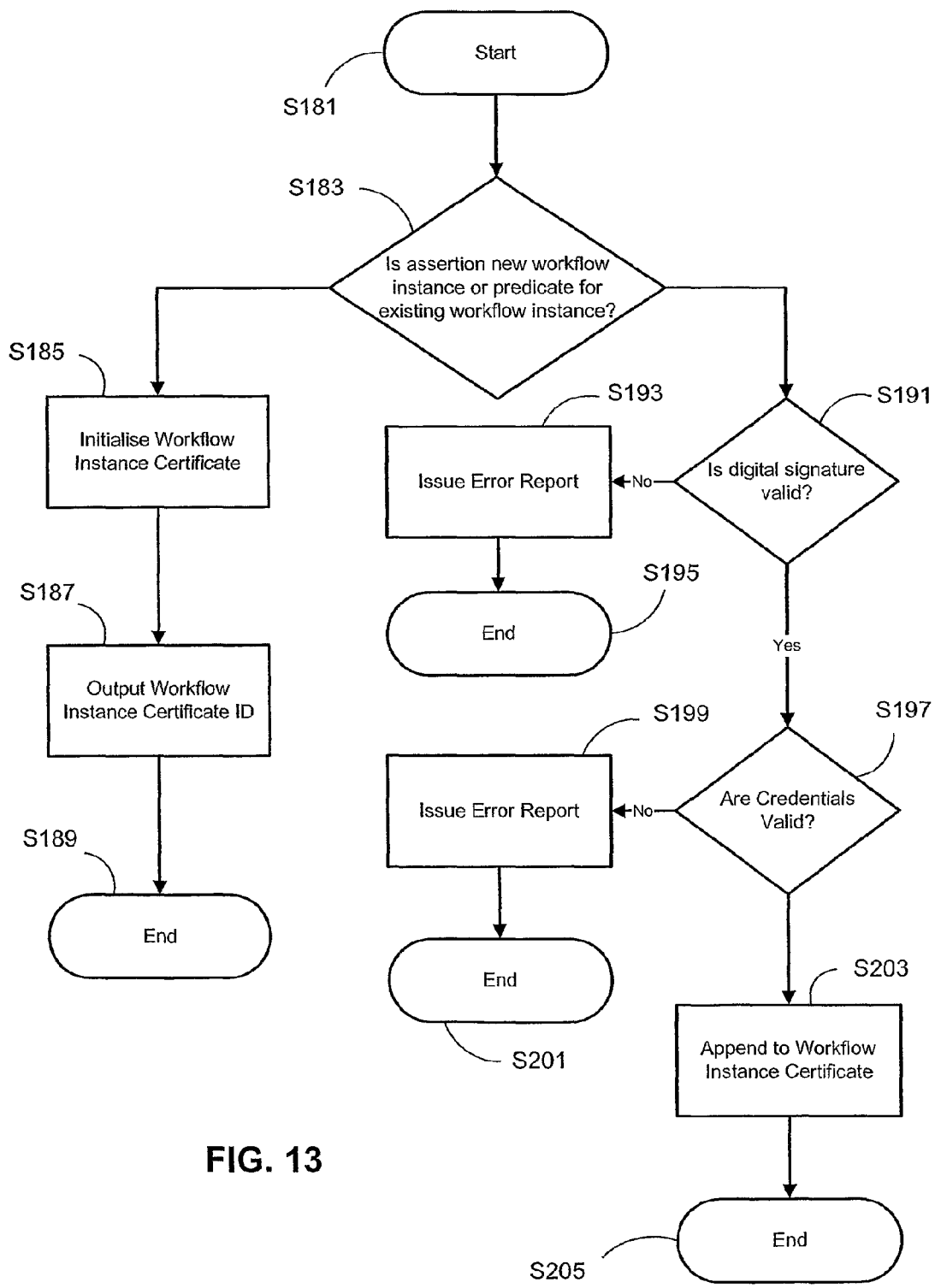
FIG. 13 is a flow chart schematically showing operations performed during execution of the Process_Assertion sub-routine by the secure processing apparatus illustrated in FIG. 6.

The Process_Assertion routine 169 is schematically represented in FIG. 13. The Process_Assertion routine 169 is initiated in response to the receipt of an assertion by the hardware security module 101.

Figure 4:
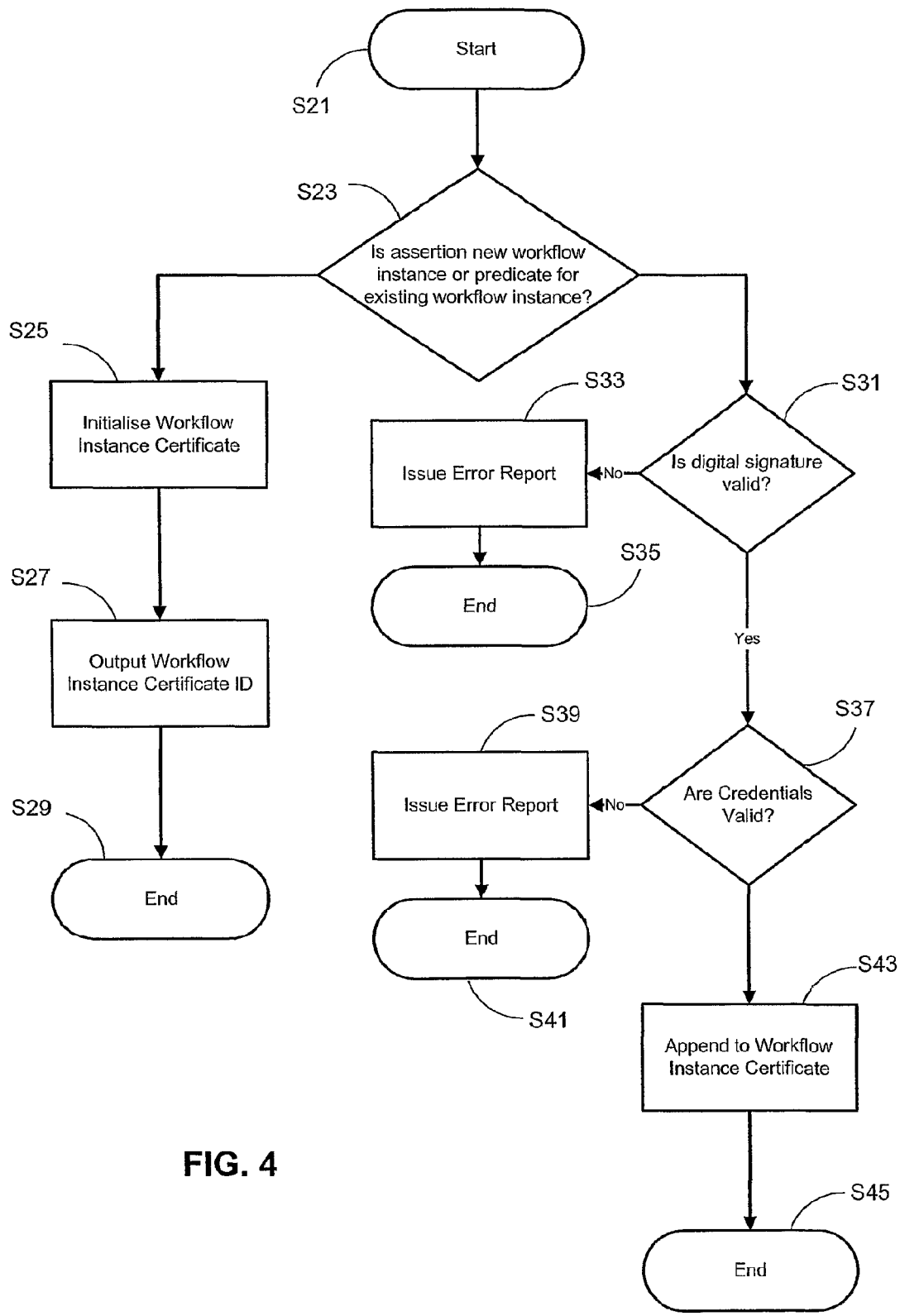
FIG. 4 is a flow chart schematically showing operations performed by a Process_Assertion sub-routine executed by the secure processing apparatus illustrated in FIG. 2.

As shown in FIG. 13, the operations performed by the Process_Assertion routine 169 match the operations performed by the Process_Assertion routine of the First Embodiment (as illustrated in FIG. 4) and therefore will not be described in detail.

The Invoke_Secure_Operation Routine

Figure 14:
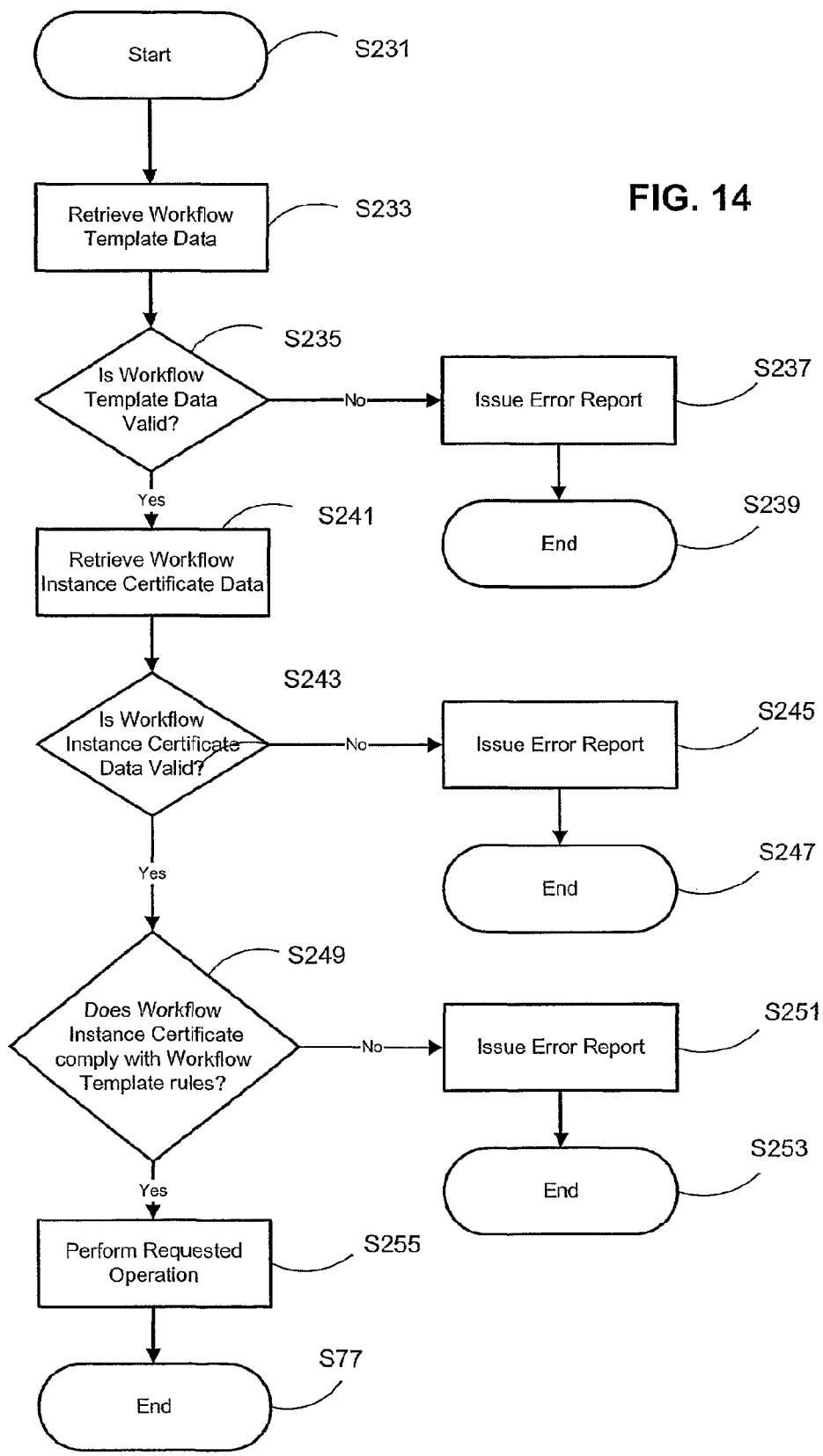
FIG. 14 is a flow chart schematically showing operations performed during execution of an Invoke_Secure_Operation sub-routine by the secure processing apparatus illustrated in FIG. 6.

The Invoke_Secure_Operation will now be described with reference to FIG. 14. After initiation, at S231, of the Invoke_Secure_Operation routine 171 in response to receipt of a request to check compliance of a workflow instance certificate (identified by the corresponding workflow instance certificate identifier) with the requirements set out in a corresponding workflow template, the hardware security module retrieves, at S233, all the workflow template data from the workflow templates region 141 and checks, at S235, if the workflow templates data is valid by applying the SHA-1 algorithm to the retrieved workflow template data to generate a hash value and checking that the generated hash value matches the workflow templates hash value stored in the NVRAM 113. If it is determined that the retrieved workflow templates data is not valid, then the hardware security module 101 issues, at S237, an error report and the routine ends at S239.

If the retrieved workflow templates data is valid, then the hardware security module 101 retrieves, at S241, the workflow instance certificate data stored in the workflow instance certificates region 143 for the workflow instance certificate identifier and checks, at S243, that the workflow instance certificates data is valid. If it is determined that the information within the workflow instance certificate data is not valid, then the hardware security module issues, at S245, an error report and the routine ends at S247.

If it is determined that the information in the workflow instance certificate is valid, then the hardware security module 101 checks, at S243, that the requirements set out in the workflow template corresponding to the received workflow instance certificate identifier are satisfied by the predicate assertions recorded in the workflow instance certificate associated with the workflow instance certificate identifier. If it is determined that the requirements of the workflow instance certificate are not satisfied, then the hardware security module 101 issues, at S251, an error report and the routine ends at S253.

If it is determined that the requirements of the workflow template are satisfied, then the hardware security module 101 performs, at S255, the requested operation, the operation by the hardware security module is logged in the manner described with reference to FIG. 12, and the routine ends at S257.

As in the first embodiment, for all the workflow templates the performance of the requested secure operation involves the issuance of a data segment. When outputting the requested data segment, the hardware security module 1 signs the data segment by generating a digital signature using the private key associated with the appropriate workflow template. In order to generate the private key associated with the appropriate workflow template, the hardware security module 101 retrieves the key store data from the key store memory region 145, verifies the key store data by applying the SHA-1 algorithm to the retrieved key store data to generate a hash value and checking that the generated hash value matches the key store hash value stored in the NVRAM 113, and then recovers the private key by decrypting the encrypted key associated with the workflow template using the root cryptographic key stored in the ROM 105 of the hardware security module 101.

The Validate_Exclusivity Routine

The Validate_Exclusivity routine is used by the hardware security module 101 in response to receipt of a request to verify data stored in the data memory 121. In response to such a request, the Hardware Security Module 101 retrieves the workflow templates data, the key store data and the log data stored in the data memory 121, applies the SHA-1 algorithm to each set of imported data to generate a corresponding hash value, and checks that the generated hash values match the corresponding hash values stored in the NVRAM 113 corresponding to the imported data.

MODIFICATIONS AND FURTHER EMBODIMENTS

In the second embodiment, hash value data is stored in the data memory 121 outside of the hardware security module 101. This allows a preliminary verification of the integrity of data stored in the data memory 121 using the host processor 119, i.e. without using the hardware security module 101. Accordingly, before each operation of the hardware security module 101 an initial check of the data required from the data memory 121 may be performed by the host processor 119. However, a check by the hardware security module 101 is still required as the hash value data stored in the data memory 121 is not necessarily secure.

In an alternative embodiment, the hash value data is only stored in the NVRAM 113 of the hardware security module 101.

In the second embodiment, the general technique for verifying data stored outside the hardware security module 101 is to import the data into the hardware security module 101, apply the SHA-1 algorithm to generate a hash value, and check that the generated hash value matches a hash value corresponding to the imported data stored in the NVRAM of the secure hardware module.

In the second embodiment, all the workflow templates are grouped together into one data set, all the key store data is grouped together into a second data set and all the log data is grouped together into a third data set. The SHA-1 algorithm is then applied to each data set to generate three hash values. It will be appreciated that alternative ways of grouping the data stored externally to the hardware security module into data sets, with a hash value being stored in NVRAM within the hardware security module for each data set, could be used.

In an alternative embodiment, multiple users are able to register workflow templates using the hardware security module, and all the data (i.e. workflow templates, key store data and log data) associated with each individual user is grouped together into a data set and a corresponding hash value for the data set is stored in the NVRAM of the hardware security module. In an alternative embodiment, the workflow templates for one user are grouped together into a data set, the key store data for one user are grouped together into a single data set and the log data for one user is grouped together in a single data set. An advantage of such arrangements is that if the data for one user is corrupted, then the data for the other users may still be used.

If data stored externally to the hardware security module is corrupted, then some form of recovery operation must take place. Generally, it is advantageous to group the data stored outside of the hardware security module into as many data sets as possible, bearing in mind that the NVRAM in the hardware security module only has a limited memory amount to store the hash values, so that as little data as possible needs to be recovered.

In some embodiments, it may be desired to group the data stored externally to the hardware security module in so many data sets that the NVRAM of the hardware security module is not able to store all the hash values corresponding to the data sets. In order to overcome this problem, it is possible to store a table of hash data in the data memory 121, and to apply the SHA-1 algorithm to the table of hash value data to generate a root hash value data for storage in the NVRAM.

It is advantageous to cluster hardware security modules in order to protect against destruction of a single hardware security leading to a catastrophic loss of data, and to allow scalability. This can be achieved using technology such as the ncipher Security World. In using this technology, the amount of data securely communicated between the cluster of HSMs should be kept to a minimum. It will be appreciated that according to the present invention this data can be reduced to a single hash value derived from a table of hash values.

In the second embodiment, secure storage of the private keys is achieved by encrypting the private keys using a root cryptographic key which is stored within the hardware security module, thereby allowing the encrypted private keys to be stored externally of the hardware security module. In this way the requirement for non-volatile random access memory within the hardware security module is reduced. However, if plenty of NVRAM was available in the hardware security module then all the private keys could be stored in the hardware security module.

Although in the second embodiment, the retrieval of data is schematically represented by a series of data requests occurring throughout a process, in practice when a processing request is received the hardware security module checks whether the required data is cached in the RAM 107, and if any data is missing the hardware security module requests that data before commencing any other processing. This includes requesting any public key certificates which are required to confirm a rule compliance requirement.

In a modification of the second embodiment, the secure processing apparatus stores a list of revoked public certificates in the data memory 121 and maintains a hash value in the NVRAM of the hardware security module in the same way as the log data hash value is maintained. Whenever a public key certificate is used, the hardware security module checks that it is not on the revoked list.

In another modification to the second embodiment, each time compliance of a workflow instance certificate with the corresponding workflow template is found, the completed workflow instance certificate is signed and stored in a list of completed workflow instance certificates. As with the list of log data, the completeness of the list of workflow compliance certificates may be made verifiable by keeping a running hash value.

Although in the described embodiments the provisions of a workflow template required that assertions be certified as true, in other embodiments provisions could be included which require that approvals be received by a defined number of authorised parties. An example of such an embodiment is a workflow template for accessing confidential information such as medical records. A provision of such a workflow template could be that three of five identified authorising parties approve the accessing of the confidential information.

In the described embodiments, a secure operation involving digitally signing a data record is performed only if compliance with a procedure defined in a workflow template (which could be called a public template because it does not require secure storage) is verified. Another main envisaged application for the present invention is controlling access to encrypted information, whereby only after the compliance with a procedure defined by a workflow template has been verified may a decryption operation take place.

In the first and second embodiments, a private-key/public-key pair is generated for each workflow template. In alternative embodiments, the same private-key/public-key pair could be used for multiple workflow templates. In one embodiment, a common private-key/public-key pair is used for all workflow templates originating from a particular user.

Where reference has been made to using the SHA-1 encryption algorithm, it will be appreciated that a different one-way encryption algorithm, e.g. the MD5 algorithm, could be used instead. Similarly, where reference has been made to using the RSA algorithm, it will be appreciated that a different asymmetric algorithm, e.g. the DSA algorithm, could be used instead. In some embodiments, a symmetric encryption algorithm could be used in place of an asymmetric encryption algorithm.

Although the embodiments of the invention described with reference to the drawings comprises computer apparatus and processes performed in the computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for using in the implementation of the processes according to the invention.

The carrier may be any entity or device capable of carrying the program. For example, the carrier may comprise a storage medium, such as a ROM, for example a CD-ROM or a semi-conductor ROM, or a magnetic recording medium, for example a floppy disc or a hard disc, or an optical recording medium. Further, the carrier may be a transmissible carrier such as an electronic or optical signal which may be conveyed via electrical or optical cable or by radio or other means.

When the program is embedded in a signal which may be conveyed directly by cable or other device or means, the carrier may be constituted by such cable or other device or means. Alternatively, the carrier may be an integrated circuit in which the program is embedded, the integrated circuit being adapted for performing, or for use in the performance of, the relevant processes.

Although in the described embodiments the invention is implemented by software, it will be appreciated that alternatively the invention could be implemented by hardware devices or a combination of hardware devices in software.

The invention claimed is:

1. A method of certifying compliance with a designated process which is defined by a plurality of rules which are specified in a public template, wherein at least two rules specified in the public template include a certification requirement which requires rule compliance data for complying with each of said at least two rules to be certified by a respective valid certifying authority, the method comprising the execution by a processing apparatus in a secure environment of the steps of:

for each rule specified in the public template, receiving rule compliance data;

checking the received rule compliance data to verify that all the rules specified in the template have been complied with, including checking that for rules having a certification requirement the associated rule compliance data includes a digital signature signed by a valid certifying authority for that rule;

and issuing a process compliance certificate digitally signed by the process certifying authority if the checking step verifies compliance with the rules specified in the template.

2. A method according to claim 1, wherein said processing apparatus comprises a hardware security module, and wherein said method comprises the hardware security module:

receiving processor-implementable instructions and an associated digital s signature from a data store external to the hardware security module; and processing the digital certificate to verify the integrity of the processor implementable instructions.

3. A method according to claim 2, wherein said hardware security module comprises a non-volatile random access memory storing hash value data obtained by applying a one-way encryption algorithm to data stored externally to the hardware security module, and wherein said checking step comprises the hardware security module:

retrieving the externally stored data;

applying said one-way encryption algorithm to the externally stored data to generate hash value data; and comparing the generated hash value data with the hash value data stored in the non-volatile random access memory to check the integrity of the externally stored data.

4. A method according to claim 3, wherein the externally stored data comprises said public template.

5. A method according to claim 3, wherein the externally stored data comprises key resource data.

6. A method according to claim 3, wherein the externally stored data comprises a table of hash values, with each hash value in the table of hash values derived from a corresponding sequence of externally stored data.

7. A method according to claim 1, wherein the externally stored data comprises log data logging operations performed by the hardware security module.

8. A method of digitally signing a data record, wherein said digital signing requires compliance with a designated process which is defined by a plurality of rules, wherein at least two rules specified in the public template include a certification requirement which requires compliance with that rule to be certified by a valid certifying authority, the method comprising the method of certifying compliance with a designated process as claimed in claim 1.

9. A method of controlling access to stored data, wherein access to the data requires compliance with a designated process which is defined by a plurality of rules, wherein at least two rules associated with the designated process includes a certification requirement which requires compliance with that rule to be certified by a valid certifying authority, the method comprising the method of certifying compliance with a designated process as claimed in claim 1.

10. A method according to claim 9, wherein following compliance with the designated process, the stored data is decrypted.

11. A method of performing a secure data processing operation, the method comprising the execution by a processing apparatus in a secure environment of the steps of:

certifying compliance with a designated process which is defined by a plurality of rules which are specified in a public template, at least two rules specified in the public template include a certification requirement which requires rule compliance data for complying with each of said at least two rules to be certified by a respective valid certifying authority, the certifying step comprising: i) for each rule specified in the template, receiving rule compliance data; and ii) checking the received rule compliance data to verify that compliance with all the rules specified in the template, including checking that for rules having a certification requirement the associated rule compliance data includes a digital signature signed by a valid certifying authority for that rule;

performing the secure data processing operation to provide output data; digitally signing a data record comprising a process compliance certificate digitally verifying compliance with the rules specified in the template; and outputting the digitally signed data record; and wherein at least one of the rules specified in the public template includes a certification requirement, and wherein the certifying step comprises checking that for rules having a certification requirement, the associated rule compliance data includes a digital signature signed by a valid rule certifying authority for that rule.

12. A method according to claim 11, wherein the secure operation comprises a digital signing operation.

13. A method according to claim 11, wherein the secure operation comprises a decryption operation.

14. A data processing apparatus comprising:

a secure data store;

a processor operable to carry out a processing operation on data stored in the secure data store, wherein said processor is in a secure environment; and a controller operable to prevent processing of the data stored in the secure data store unless a plurality of rules specified in a public template associated with said processing operation are complied with, wherein for at least two of the plurality of rules, compliance with the rules requires certification by a respective valid certifying authority.

15. A data processing apparatus according to claim 14, wherein the processor comprises part of a hardware security module.

16. A data processing apparatus according to claim 15, further comprising a data store external to the hardware security module for storing data for processing by the hardware security module.

17. A data processing apparatus according to claim 16, wherein said external data store comprises processor-implementable instructions having an associated digital signature, wherein the data processing apparatus is operable to transfer said processor-implementable instructions to the hardware security module, and wherein the hardware security module comprises a verifier operable to process said digital signature to verify the processor-implementable instructions.

18. A data processing apparatus according to claim 16, wherein said external data store comprises data for processing by said hardware security module, and wherein said hardware security module comprises:

non-volatile random access memory storing hash value data associated with data stored in the external data store; and a verifier operable to verify data stored in the external data store using the hash value data stored in the non-volatile random access memory.

19. A data processing apparatus according to any of claim 17, wherein the secure hardware module stores a cryptographic key resource and is operable to encrypt and decrypt data using the cryptographic key resource so that, after encryption, the data may be securely stored in the external data memory.

20. A non-transitory computer readable medium storing instructions which when executed by at least one processor causes a process comprising:

for each rule specified in a template, receiving rule compliance data;

checking the received rule compliance data to verify that all the rules specified in the template have been complied with, including checking that for rules having a certification requirement the associated rule compliance data includes a digital signature signed by a valid rule certifying authority for that rule; and issuing a process compliance certificate digitally signed by the process certifying authority if the checking step verifies compliance with the rules specified in the template.

21. A method according to claim 1, wherein the processing apparatus and at least one of the rule certifying authorities are different devices.

* * * * *